United States Patent Office.

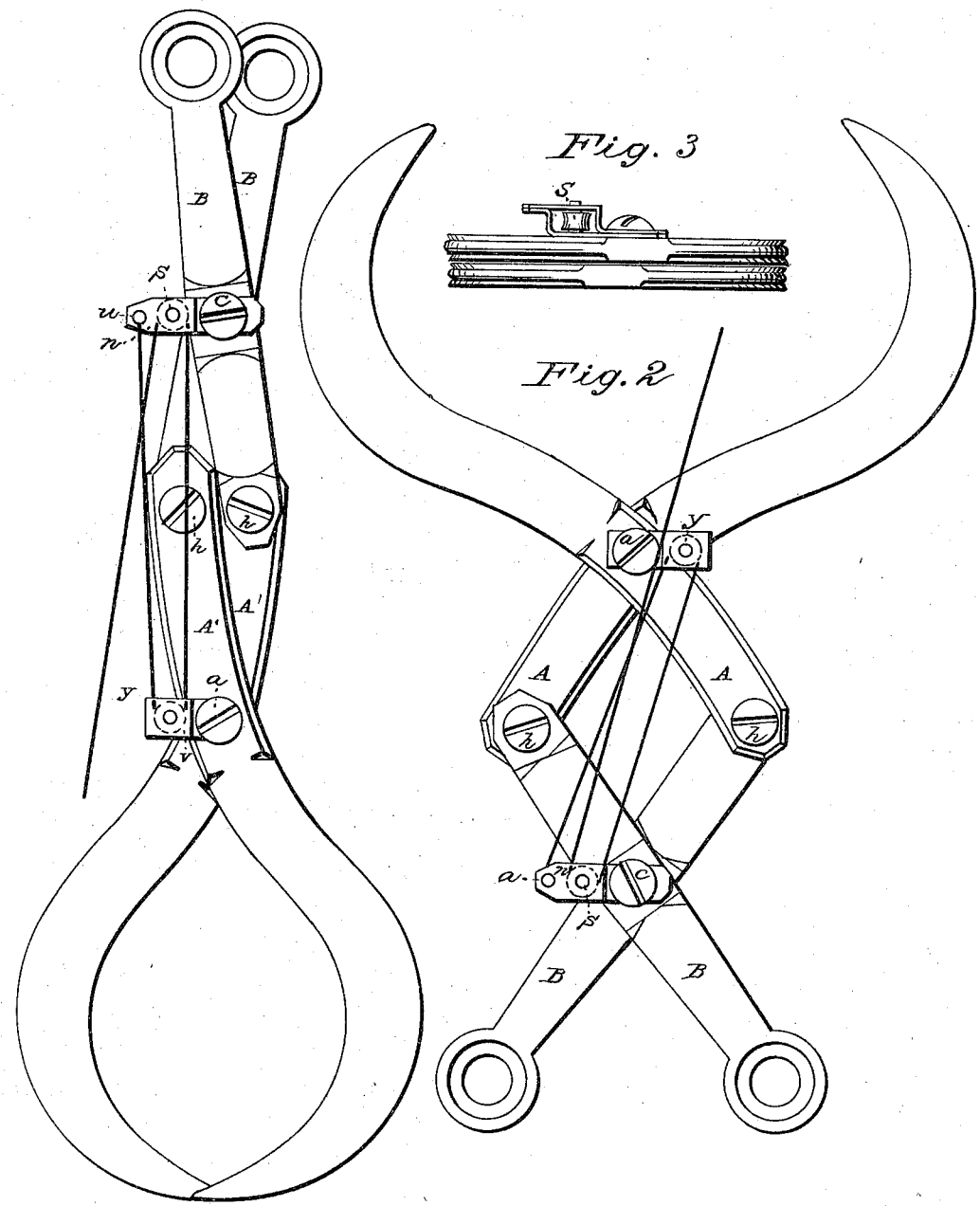

JOHN J. DE GRUMMOND, OF KNOXVILLE, ILLINOIS.

Letters Patent No. 97,171. dated November 23, 1869.

IMPROVEMENT IN HORSE HAY-FORKS.

The Schedule referred to in these Letters Patent and making part of the same.

*To all whom it may concern:*

Be it known that I JOHN J. DE GRUMMOND, of Knoxville, in the county of Knox, and State of Illinois, have invented a new and valuable Improvement in Hay-Forks; and I do hereby declare that the following is a full, clear, and exact description of the construction and operation of the same, reference being had to the annexed drawings, making part of this specification, and to the letters and figures of reference marked thereon.

Figure 1, of the drawings, is a plan view of my invention, with the tines closed.

Figure 2 is a plan view of the same, with the tines open.

Figure 3 is a detail.

My invention relates to forks for raising large masses of hay, straw, manure, ice, or other similar substances, and It consists, mainly, in a novel arrangement of devices, intended to serve the purpose designated, in a ready and efficient manner.

The letters A, of the drawings, represent two heavy forks, of the form shown, and pivoted together at the point *a*.

The letters B represent two arms or levers, pivoted together at the point *c*, and also pivoted to the forks A at the points *h*.

The letter *n* represents a block, pivoted by the same bolt that unites the levers B, and holding a pulley, *s*, as shown. I also make a small opening in the flange of said block, at the point *u*, for fastening the rope by which the forks are actuated.

The letter *r* represents a block, pivoted to the forks by the same bolt that unites them, and which is arranged for holding the pulley *y*.

The rope for actuating the fork is fastened to the opening in the flange of block *n*, and is passed around the pulleys *s* and *y*.

The above-mentioned devices, when arranged as shown, serve as efficient means for raising large bodies of hay and other commodities of a like character. They are cheap of construction, and simple in operation.

What I claim as my invention, and desire to secure by Letters Patent, is—

A hay-fork, having forks A, levers B, blocks *n* and *r*, and pulleys *s* and *y*, constructed and arranged substantially as specified.

In testimony that I claim the above, I have hereunto subscribed my name, in the presence of two witnesses.

JOHN J. DE GRUMMOND.

Witnesses:
   JNO. T. BOWEN,
   GEO. PUTERBAUGH.